F. H. AULD.
DEVICE FOR SECURING NAME PLATES AND THE LIKE.
APPLICATION FILED SEPT. 15, 1917.
1,274,497.
Patented Aug. 6, 1918.
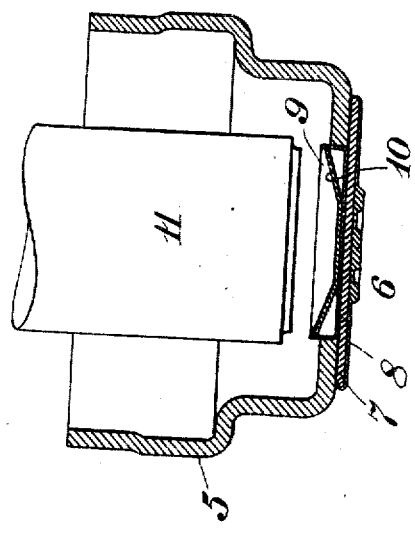
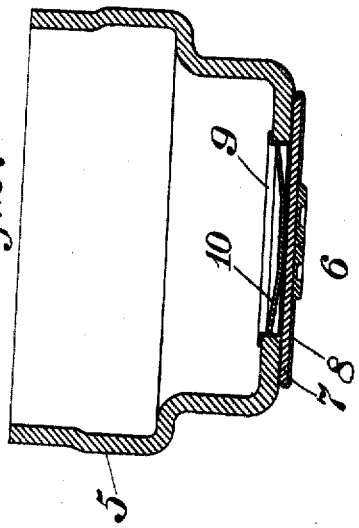
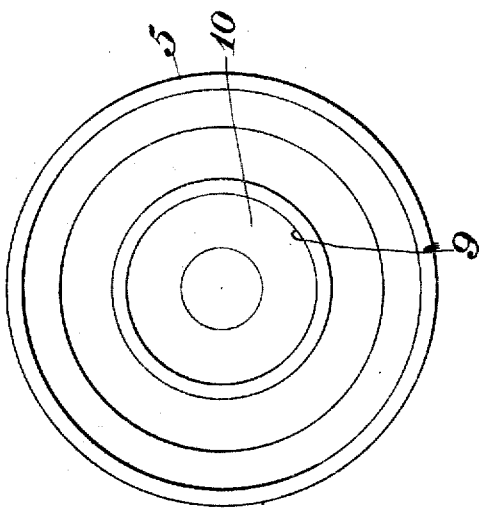
Witness
Frederick Howard Auld Inventor
By
his Attorneys

UNITED STATES PATENT OFFICE.

FREDERICK HOWARD AULD, OF COLUMBUS, OHIO.

DEVICE FOR SECURING NAME-PLATES AND THE LIKE.

1,274,497.  Specification of Letters Patent.  Patented Aug. 6, 1918.

Application filed September 15, 1917. Serial No. 191,554.

*To all whom it may concern:*

Be it known that I, FREDERICK HOWARD AULD, a citizen of the United States, residing at Columbus, in the county of Franklin and State of Ohio, have invented a certain new and useful Improvement in Devices for Securing Name-Plates and the like, of which the following is a specification.

The object of this invention is to provide improved means whereby a name plate or other object can be secured with great firmness to another body and at the same time in such a manner as to prevent leakage of oil or other liquids. The invention is especially applicable to the hub caps of automobile wheels, said caps usually bearing the name or other insignia identifying the make of the automobile.

The invention is embodied in the example shown in the accompanying drawing and particularly set forth and claimed in the following specification.

In said drawing—

Figure 1 is an axial sectional view of a hub cap showing the name plate equipped with the securing means applied to an orifice in the end of the hub cap and ready to be pressed into secured position.

Fig. 2 shows the securing means pressed into secured position.

Fig. 3 is a plan view looking at the inner end of the hub cap.

In the views 5 designates the hub cap which is provided at its outer end with a circular orifice of a diameter suitable to just about receive the securing means. The character 6 designates the name plate which, in the instance shown, includes a plain back piece or disk 7 of sheet metal and a front covering piece 8 of sheet metal spun around the edge of the piece 7. The front covering piece 8 has pressed, engraved or otherwise put upon it the name, insignia or ornamentation desired.

The character 9 designates a shallow cup shaped member which is of thin sheet metal and of as nearly as practical the diameter, externally, of the orifice in the end of the hub. The depth of the cup shaped piece is made somewhat greater than the thickness of the metal of the end of the hub cap. 10 designates an expanding member for the cup shaped member. This member 10 is of frusto-conical form and of sheet metal preferably of heavier gage than the member 9. The member 10 is "spot-welded" to the bottom of the cup shaped member 9 and the member 9 is spot-welded to the member 7 preferably before the covering piece 8 is applied to the disk 7 so as not to disfigure said covering piece 8.

The name plate thus prepared is applied to the outer end of the hub, the fastening means entering the orifice thereof as shown in Fig. 1. The edge of the cup shaped member is then bent outward over the margin of the orifice at the inner side of the hub cap, the frusto-conical expanding member 10 being preferably in the same operation, pressed inward so as to force the wall of the cup shaped member against the wall of the orifice all around. The name plate is thus rendered leak proof and secured in place by the coöperation of the cup shaped member and the expanding member. In Fig. 1 a tool or die designated 11 is shown for turning over the edge of the cup shaped member and pressing the expanding member inward. In practice the name plate and hub cap are of course supported upon a suitable block or anvil (not shown) while pressure is applied to the tool 11 to perform the described operation.

The forms, dimensions and application of the parts can be varied without departing from the gist of the invention as claimed.

What I claim is:

1. Means for securing a name plate to another object having an opening consisting in the combination with the name plate, of a cup shaped member to fit in the opening and an expanding member to press the annular wall of the cup shaped member against the wall of the opening.

2. Means for securing a name plate to another object having an opening consisting in the combination, with the name plate of a cup shaped member to fit in the opening, said cup shaped member being of greater depth than the depth of said opening and adapted to have its edge bent over the margin of the opening and an expanding member within the cup shaped member to press the annular wall of the cup shaped member against the wall of said opening.

FREDERICK HOWARD AULD.